US012473185B2

(12) United States Patent
Trieste, Jr. et al.

(10) Patent No.: US 12,473,185 B2
(45) Date of Patent: Nov. 18, 2025

(54) LIFT SYSTEM FOR UTILITY COVERS

(71) Applicant: Consolidated Edison Company of New York, Inc., New York, NY (US)

(72) Inventors: Richard J. Trieste, Jr., Staten Island, NY (US); Stephen Fereance, Garden City, NY (US); Steve Labudzinski, Poughkeepsie, NY (US)

(73) Assignee: CONSOLIDATED EDISON COMPANY OF NEW YORK, INC., New York, NY (US)

( * ) Notice: Subject to any disclaimer, the term of this patent is extended or adjusted under 35 U.S.C. 154(b) by 238 days.

(21) Appl. No.: 18/177,936

(22) Filed: Mar. 3, 2023

(65) Prior Publication Data

US 2023/0278845 A1 Sep. 7, 2023

Related U.S. Application Data

(60) Provisional application No. 63/317,312, filed on Mar. 7, 2022.

(51) Int. Cl.
*B66F 19/00* (2006.01)

(52) U.S. Cl.
CPC .................................. *B66F 19/005* (2013.01)

(58) Field of Classification Search
CPC ..................................................... B66F 19/005
See application file for complete search history.

(56) References Cited

U.S. PATENT DOCUMENTS 6,682,049 B2 * 1/2004 Thompson .............. E04F 21/20 254/8 R
8,123,181 B2 * 2/2012 Choi ........................ F16B 47/00 248/205.5
2022/0205473 A1 * 6/2022 Zimmerman ........... F16B 47/00
2024/0076167 A1 * 3/2024 Solomon ................. B66F 9/181

OTHER PUBLICATIONS

All-Vac Industries. "Expert in suction cups-vacuum cups-vacuum lifters." https://www.allvacindustries.com/ (retrieved Feb. 9, 2023). 7 pages.
VacMotion. "VacMotion Suction cups, vacuum cups, vacuum filters, in-line strainers & filters." https://www.vacmotion.com/index.aspx (retrieved Feb. 9, 2023). 1 page.

* cited by examiner

*Primary Examiner* — Seahee Hong
(74) *Attorney, Agent, or Firm* — CANTOR COLBURN LLP

(57) ABSTRACT

A lifting device, a method, and a system for lifting for utility cover is provided. The lifting device includes a body having a curved portion, the curved portion defining an interior area. A flange extends about the periphery of the body, the flange made from a compliant material that forms a seal with a top surface of an irregular or smooth surface utility cover. A lifting element is coupled and centrally positioned to the body.

18 Claims, 4 Drawing Sheets

LIFT SYSTEM FOR UTILITY COVERS

CROSS-REFERENCE TO RELATED APPLICATIONS

This application claims the benefit of U.S. Provisional Application No. 63/317,312 filed Mar. 7, 2022, the disclosure of which is incorporated herein by reference in its entirety.

BACKGROUND OF THE DISCLOSURE

The subject matter disclosed herein relates to a system for lifting utility covers and, in particular, to a lift system that is adaptable to a variety of different utility covers.

Utility covers, sometimes referred to as manhole covers, are used to enclose an opening in the ground that leads to a utility vault or chamber, such as for electrical or gas utilities for example. Utility covers prevent persons or objects from falling into the opening and also prevent unauthorized persons from accessing the subterranean structure. Utility covers are made from a variety of materials, such as cast iron, concrete, composites or a combination thereof. The covers need to be strong to support the weight of anyone, or anything that steps on or crosses the cover, such as an automobile or a commercial truck for example. As a result, utility covers are heavy, weighing 200 lb-300 lb (90 kg-136 kg). The utility cover is typically mounted or placed in a ring-shaped frame and has a thickness so that it is substantially flat with the surface of the ground where it is installed.

Due to the weight of the utility cover, removal and movement of the cover by utility personnel can be difficult. A tool, such as a J-hook 100 shown in FIG. 1 may be used by utility personnel 102 to engage and lift the manhole cover 104 from the opening 106. It should be appreciated that this method of lifting the utility cover 104, while effective, is difficult. Other lifting systems are available, such as magnetic lifts or clamps using lever type mechanisms that attach to the surface of the utility cover. However, utility covers often have surface features or texturing 108 that reduce the effectiveness of these magnetic lifting devices or clamps.

While existing devices and methods of removing and moving utility covers are suitable for their intended purposes the need for improvement remains, particularly in providing a tool for removing utility covers having the features described herein.

BRIEF DESCRIPTION OF THE DISCLOSURE

According to one aspect of the disclosure a lifting device for utility cover is provided. The lifting device includes a body having a curved portion, the curved portion defining an interior area. A flange extends about the periphery of the body, the flange made from a compliant material that forms a seal with a top surface of an irregular or smooth surface utility cover. A lifting element is coupled and centrally positioned to the body.

In addition to one or more of the features described herein, or as an alternative, further embodiments of the lifting device may include a mounting member disposed between the lifting element and the body.

In addition to one or more of the features described herein, or as an alternative, further embodiments of the lifting device may include the lifting element having a ring shape.

In addition to one or more of the features described herein, or as an alternative, further embodiments of the lifting device may include a valve operably coupled to the body.

In addition to one or more of the features described herein, or as an alternative, further embodiments of the lifting device may include the valve defining a fluid path between the interior area and the atmosphere.

In addition to one or more of the features described herein, or as an alternative, further embodiments of the lifting device may include a vacuum pump operably coupled to the valve and configured to remove a portion of the air from the interior area when the flange is sealed to the top surface.

In addition to one or more of the features described herein, or as an alternative, further embodiments of the lifting device may include the body having a semi-spherical shape.

According to another aspect of the disclosure a method of moving a utility cover is provided. The method includes placing a lifting device on the utility cover, the lifting device having a body and a flange disposed about the periphery of the body, the lifting device further having a lifting element coupled to the body. The flange is sealed to the utility cover. The lifting element is moved in a direction away from the utility cover to deform the body. The pressure is reduced in an interior portion defined by the body in response to deforming the body. The utility cover is moved with the lifting device based at least in part on the sealing of the flange to the utility cover and the reducing of pressure.

In addition to one or more of the features described herein, or as an alternative, further embodiments of the method may include coupling a vacuum pump to a valve coupled to the body.

In addition to one or more of the features described herein, or as an alternative, further embodiments of the method may include reducing the pressure in the interior portion with the vacuum pump after the sealing of the flange.

In addition to one or more of the features described herein, or as an alternative, further embodiments of the method may include decoupling the lifting device from the utility cover.

In addition to one or more of the features described herein, or as an alternative, further embodiments of the method may include the decoupling step also unsealing at least a portion of the flange from the utility cover.

In addition to one or more of the features described herein, or as an alternative, further embodiments of the method may include the decoupling also flows air at atmospheric pressure to the interior area.

In addition to one or more of the features described herein, or as an alternative, further embodiments of the method may include the vacuum pump being manually or mechanically operated.

According to yet another aspect of the disclosure a system for removing a utility cover is provided. The system includes a body having a curved portion, the curved portion defining an interior area. A flange extends about the periphery of the body, the flange made from a sealing material that is configured to define a pressure seal when placed in contact with a top surface of an irregular or smooth surface utility cover. A lifting element is coupled and centrally positioned to the body. A means is provided for reducing a pressure in the interior area.

In addition to one or more of the features described herein, or as an alternative, further embodiments of the system may include the means for reducing pressure deforming the curved portion when the lifting element is moved in a direction away from the utility cover.

In addition to one or more of the features described herein, or as an alternative, further embodiments of the lifting device may include the means for reducing pressure fluidly coupling a vacuum device to the interior area and withdrawing air from the interior area.

In addition to one or more of the features described herein, or as an alternative, further embodiments of the lifting device may include the curved portion having a concave shape.

In addition to one or more of the features described herein, or as an alternative, further embodiments of the lifting device may include the flange being made from an elastomer or a natural rubber.

In addition to one or more of the features described herein, or as an alternative, further embodiments of the lifting device may include the lifting element being a ring shape.

These and other advantages and features will become more apparent from the following description taken in conjunction with the drawings.

BRIEF DESCRIPTION OF DRAWINGS

The subject matter, which is regarded as the disclosure, is particularly pointed out and distinctly claimed in the claims at the conclusion of the specification. The foregoing and other features, and advantages of the disclosure are apparent from the following detailed description taken in conjunction with the accompanying drawings in which:

The detailed description explains embodiments of the disclosure, together with advantages and features, by way of example with reference to the drawings.

DETAILED DESCRIPTION OF THE DISCLOSURE

Embodiments of the present disclosure provide a lifting system for lifting and moving a utility cover, such as from the street or sidewalk for example. Embodiments disclosed herein provide advantages that allow the lifting device to attach to utility covers having a variety of styles and surface features or textures.

Figure 1:
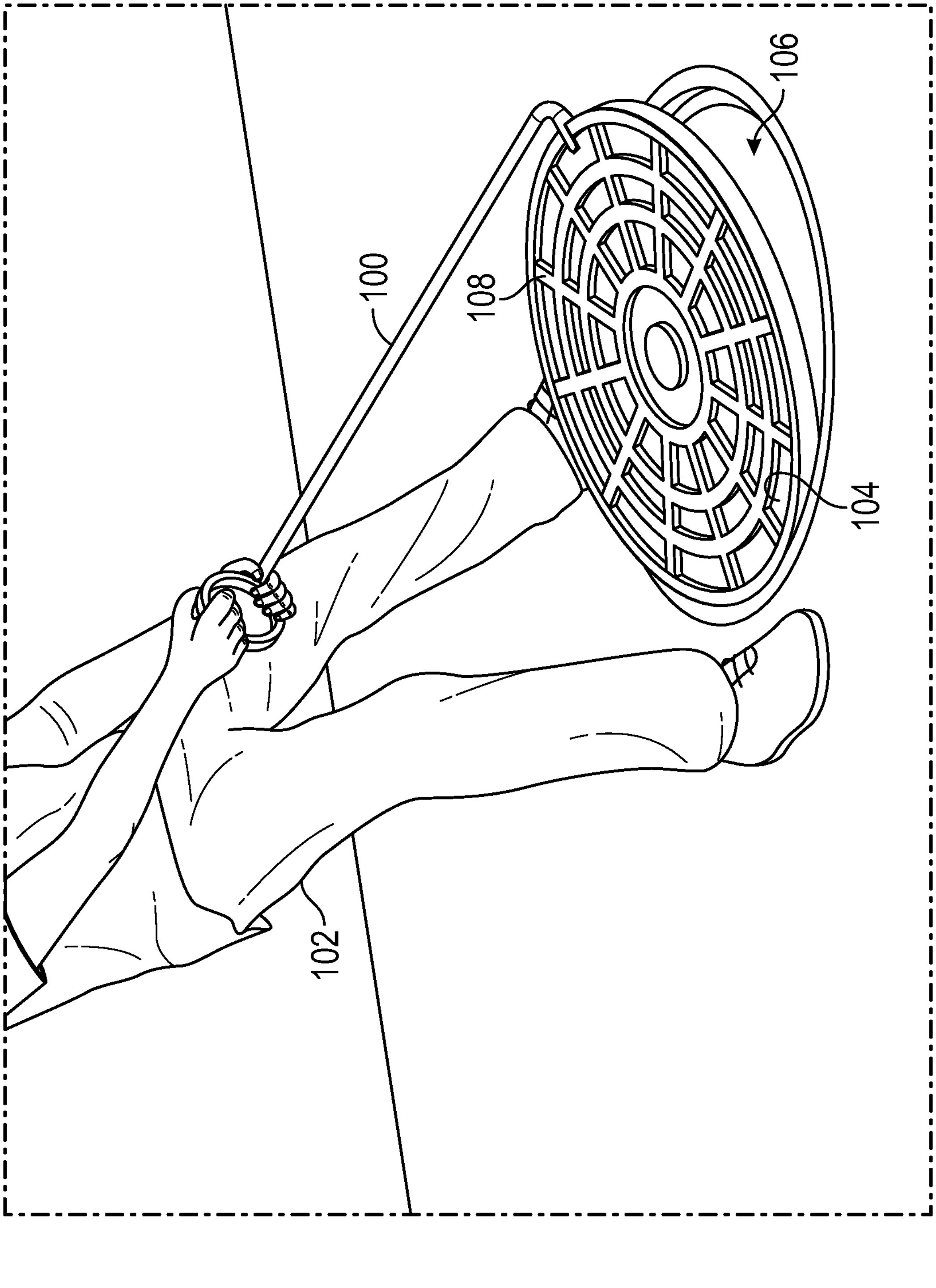
FIG. 1 (PRIOR ART)
FIG. 1 is a perspective view of a prior art J-hook type device being used to remove a utility cover.
Figure 2:
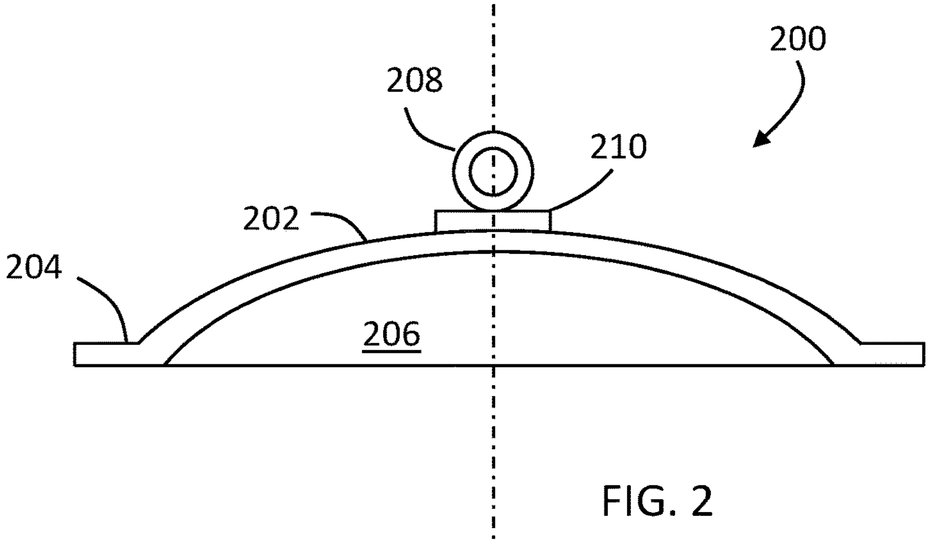
FIG. 2 is a side sectional view of a lifting device for removing a utility cover in accordance with an invention.

Referring now to FIG. 2, an embodiment is shown of a lifting device 200. The lifting device 200 includes a body 202 having a flange portion 204 extending about a periphery of the body 202. In an embodiment, the body 202 has a semi-curved or semi-spherical shape, such as a concave shape for example. In an embodiment, the flange 204 and the body 202 are integrally formed to define a unitary member. In another embodiment, the flange 204 is formed from a separate component. In an embodiment, the flange 204 is made from a compliant material that allows the forming of a seal between the interior 206 of the lifting device 200 and the external environment when the lifting device 200 is placed on a utility cover.

A lifting element, such as a ring 208 is attached to the body 202, such as through a mount 210. In an embodiment, the ring 208 is centrally positioned, such as coaxial with a centerline of the body 202 for example. As discussed in more detail herein, the ring 208 allows for a tool to engage the lifting device and move the utility cover. In an embodiment, the body 202 and flange are made from an elastomeric or natural rubber material. In an embodiment, the body 202, flange 204, and mount 210 are integrally formed to define a unitary member. In another embodiment, body 202 cab be metallic or composite with flange 204 being an elastomeric or natural rubber material joined so as to create a bond suitable of a pressure seal.

Figure 3:
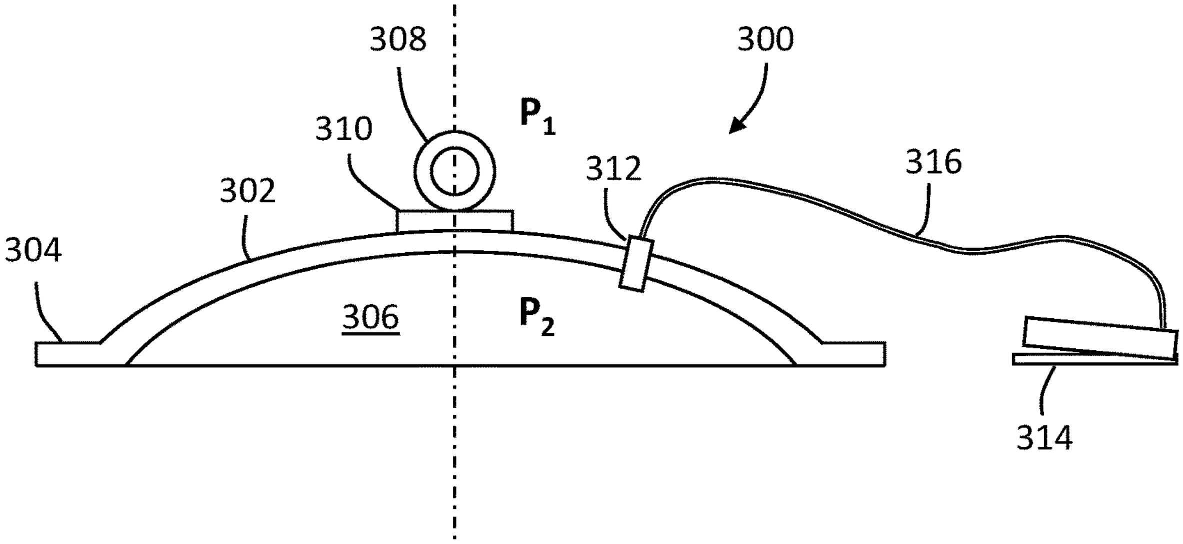
FIG. 3 is a side sectional view of another lifting device for removing a utility cover in accordance with an invention.

Referring now to FIG. 3, another embodiment is shown of a lifting device 300. In this embodiment, the lifting device 300 includes a body 302, a flange 304, an interior 306, a ring 308 and a mount 310 in the same or a similar manner to the lifting device 200. In this embodiment, a port or valve 312 is provided that is fluidly coupled with the interior 306. In an embodiment, the valve 312 is a Schrader valve or similar type valve. The valve 312 is configured to be removably coupled with a vacuum pump 314, such as via a hose 316. The vacuum pump 314 may be a manually operated vacuum pump, such as a foot operated pump for example, or may be an electrical or motorized vacuum pump. The vacuum pump 314 draws air out of the interior 306 to increase the amount of force holding the utility cover (i.e. increasing the differential between the interior pressure $P_2$ and the external or atmospheric pressure $P_1$).

Figure 4A:
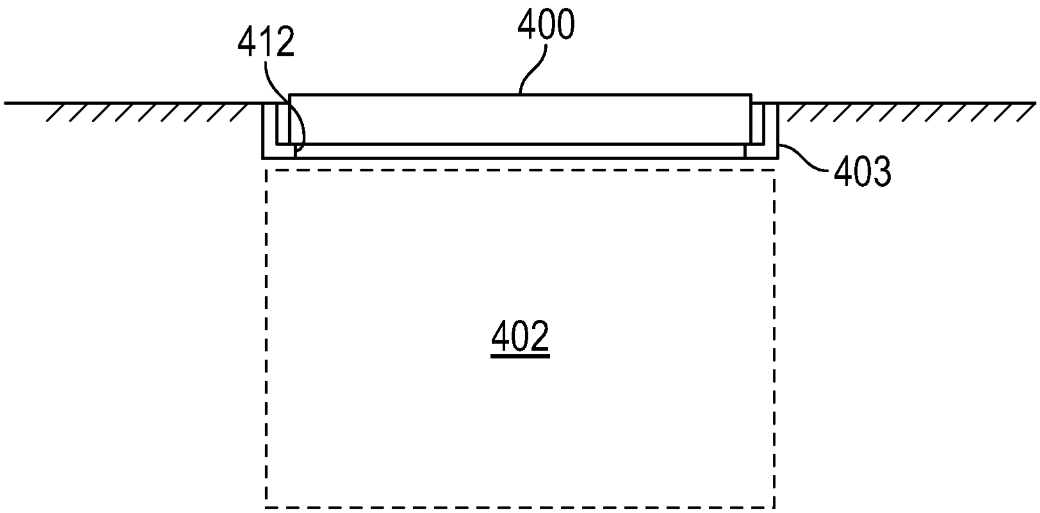
FIGS. 4A-4D are views of different stages of removing a utility cover using the lifting device of FIG. 2 in accordance with an embodiment.
Figure 4B:
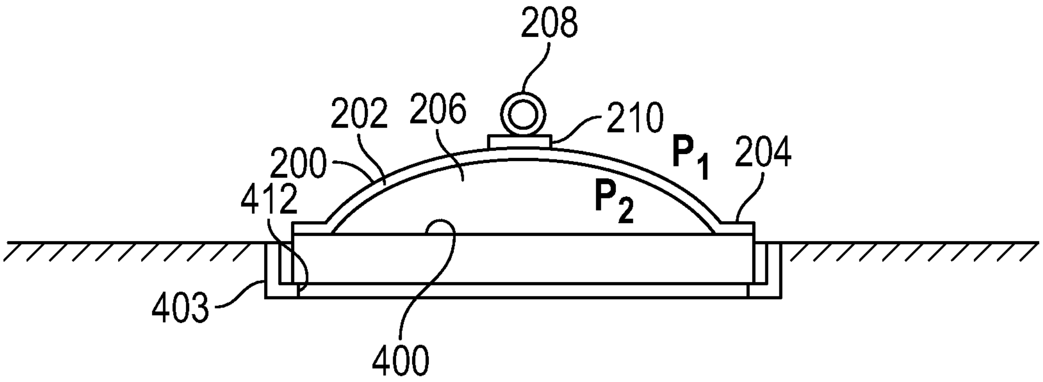

Referring now to FIGS. 4A-4D, an embodiment is shown of a method of removing a utility cover 400. The utility cover 400 is installed over an opening to a subterranean structure 402. The utility cover 400 rests on a frame 403 and is held in place under the influence of gravity. The lifting device 200 is placed on top of the utility cover 400 (FIG. 4B). In an embodiment, the lifting device 200 is centered over the utility cover 400. It should be appreciated that when the lifting device 200 is placed on the utility cover 400, the pressure $P_2$ within the interior 206 is the same as the external or atmospheric pressure $P_1$. With the lifting device 200 in place, the flange 204 seals to the top surface of the utility cover 400.

Figure 4C:
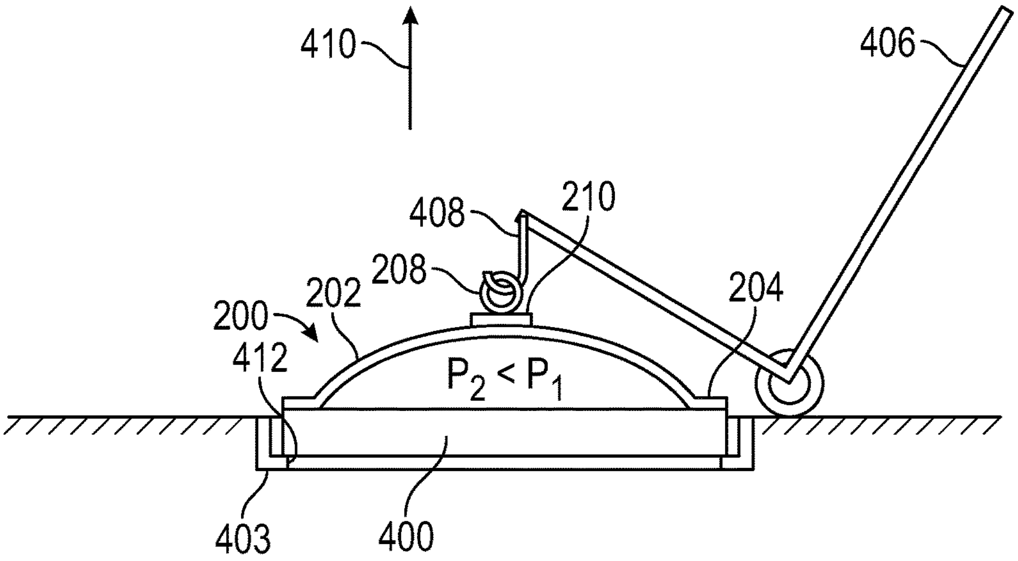

In an embodiment, the operator then connects a tool 406 to the lifting device 200 (FIG. 4C). The tool 406 may be connected to the lifting device 200 using a suitable means, such as a hook 408 that engages the ring 208 The tool 406 may be manually operated, such as by providing lever arms that provide mechanical advantage to reduce the amount of force exerted by the operator for example. The tool 406 may also be electrically or hydraulically operated for example. In either case, the tool 406 causes the ring 208 to move in the direction indicated by arrow 410. This movement causes the body 202 to deform while the flange 204 remains sealed to the top surface of the utility cover 400. As a result, the pressure ($P_2$) within the interior 206 decreases relative to the external or atmospheric pressure. In other words, $P_2$ is less than $P_1$.

The force developed by the lifting device 200 on the utility cover 400 may be determined using the formula:

$$F=A*P$$

where F is the force, A is the area of the surface covered by the lifting device 200, and where $P=P_1$, P is the pressure outside the lifting device 200 (i.e. atmospheric pressure). It should be appreciated that when the lifting device 300 is used, the amount of the reduced pressure in the interior 206 is added to the external pressure, which increases the force. In an embodiment, the force will be greater than or equal to the weight of the utility cover 400.

Figure 4D:
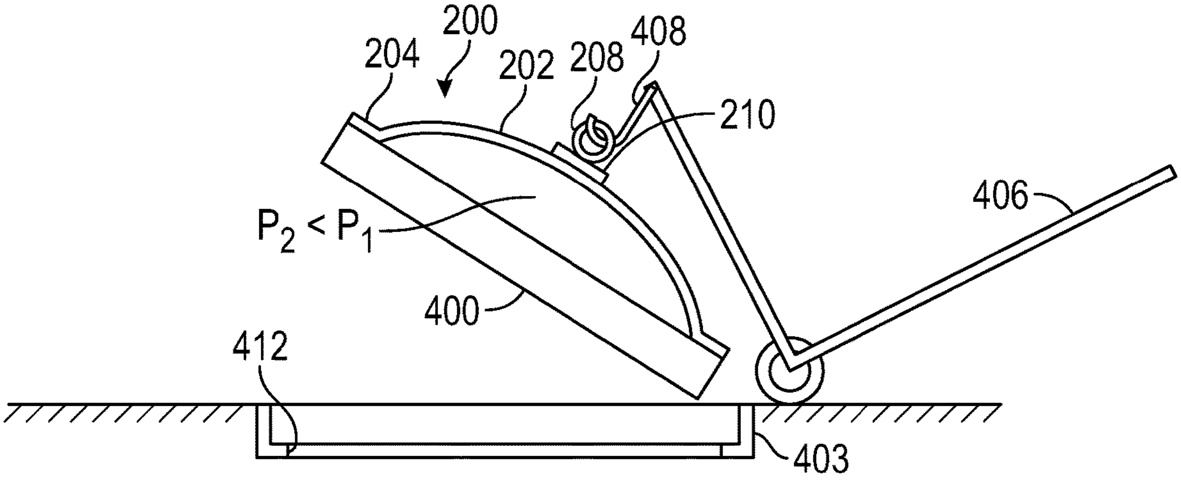

With the lifting device 200 attached to the utility cover 400, the operator may further acuate the tool 406 causing the utility cover 400 to move vertically away from the frame 403 exposing the opening 412. Once the bottom edge of the utility cover 400 clears the edge of the frame 403 or the ground, the tool 406 may be used to laterally move or swing the utility cover 400 away from the opening 410 (FIG. 4D). To install the utility cover 400 back on the frame 403, the operator reverses the process. By breaking the seal between the flange 204 and the top of the cover 400, the lifting device 200 may be uncoupled from the utility cover. When the lifting device 300 is used, the valve 312 may be actuated to equalize the pressure between the interior 306 and the atmosphere to release the lifting device.

The term "about" is intended to include the degree of error associated with measurement of the particular quantity based upon the equipment available at the time of filing the application. For example, "about" can include a range of ±8% or 5%, or 2% of a given value.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include an indirect "connection" and a direct "connection." It should also be noted that the terms "first", "second", "third", "upper", "lower", and the like may be used herein to modify various elements. These modifiers do not imply a spatial, sequential, or hierarchical order to the modified elements unless specifically stated.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the disclosure is provided in detail in connection with only a limited number of embodiments, it should be readily understood that the disclosure is not limited to such disclosed embodiments. Rather, the disclosure can be modified to incorporate any number of variations, alterations, substitutions or equivalent arrangements not heretofore described, but which are commensurate with the spirit and scope of the disclosure. Additionally, while various embodiments of the disclosure have been described, it is to be understood that the exemplary embodiment(s) may include only some of the described exemplary aspects. Accordingly, the disclosure is not to be seen as limited by the foregoing description, but is only limited by the scope of the appended claims.

What is claimed is:

1. A lifting device for utility cover, the lifting device comprising:

a body having a curved portion, the curved portion defining an interior area;

a flange extending about a periphery of the body, the flange made from a compliant material that forms a seal with a top surface of an irregular or smooth surface utility cover; and a lifting element coupled and centrally positioned to the body, wherein the body deforms responsive to being lifted directly by the lifting element in a direction away from the utility cover, and wherein a pressure in an interior portion is reduced in response to the body deforming.

2. The lifting device of claim 1, further comprising a mounting member disposed between the lifting element and the body.

3. The lifting device of claim 1, wherein the lifting element has a ring shape.

4. The lifting device of claim 1, further comprising a valve operably coupled to the body.

5. The lifting device of claim 4, wherein the valve defines a fluid path between the interior area and the atmosphere.

6. The lifting device of claim 4, further comprising a vacuum pump operably coupled to the valve and configured to remove a portion of the air from the interior area when the flange is sealed to the top surface.

7. The lifting device of claim 1, wherein the body has a semi-spherical shape.

8. A method of moving a utility cover, the method comprising:

placing a lifting device on the utility cover, the lifting device having a body and a flange disposed about a periphery of the body, the lifting device further having a lifting element coupled to the body;

sealing the flange to the utility cover;

moving the lifting element in a direction away from the utility cover to deform the body, wherein the body deforms responsive to being lifted directly by the lifting element in a direction away from the utility cover;

reducing the pressure in an interior portion defined by the body in response to deforming the body; and moving the utility cover with the lifting device based at least in part on the sealing of the flange to the utility cover and the reducing of pressure.

9. The method of claim 8, further comprising coupling a vacuum pump to a valve coupled to the body.

10. The method of claim 9, further comprising reducing the pressure in the interior portion with the vacuum pump after the sealing of the flange.

11. The method of claim 10, further comprising decoupling the lifting device from the utility cover.

12. The method of claim 11, wherein the decoupling includes unsealing at least a portion of the flange from the utility cover.

13. The method of claim 11, wherein the decoupling includes flowing air at atmospheric pressure to the interior area.

14. The method of claim 9, wherein the vacuum pump is manually or mechanically operated.

15. A system for removing a utility cover comprising:

a body having a curved portion, the curved portion defining an interior area;

a flange extending about a periphery of the body, the flange made from a sealing material that is configured to define a pressure seal when placed in contact with a top surface of an irregular or smooth surface utility cover;

a lifting element coupled and centrally positioned to the body, wherein the curved portion deforms responsive to being lifted directly by the lifting element in a direction away from the utility cover; and wherein a pressure in the interior area is reduced in response to the curved portion deforming.

16. The system of claim 15, wherein the curved portion has a concave shape.

17. The system of claim 15, wherein the flange is made from an elastomer or a natural rubber.

18. The system of claim 15, wherein the lifting element includes a ring shape.

* * * * *